F523c OR RE 10,607

BEST AVAILABLE COPY

T. SCHMIDT,

Assignor to J. O. SHOUP, R. L. HUGHES and H. H. LAUBACH.

PAPER PACKAGE BOX.

RE, No. 10,607. Reissued June 2, 1885.

Attest.

Jno. B. Roebuck Jr.

W. E. Milliken

Inventor.

Theodore Schmidt

By Wood & Boyd

His Attys.

BEST AVAILABLE COPY

UNITED STATES PATENT OFFICE.

THEODORE SCHMIDT, OF DAYTON, OHIO, ASSIGNOR TO JOEL O. SHOUP, ROBERT L. HUGHES, AND HENRY H. LAUBACH, ALL OF SAME PLACE.

PAPER PACKAGE-BOX.

SPECIFICATION forming part of Reissued Letters Patent No. 10,607, dated June 2, 1885.

Original No. 306,531, dated October 14, 1884. Application for reissue filed April 2, 1885.

*To all whom it may concern:*

Be it known that I, THEODORE SCHMIDT, a citizen of the United States, residing at Dayton, Ohio, have invented certain new and useful Improvements in Paper Package-Boxes, of which the following is a specification.

My invention relates to improvements in paper package-boxes of such form that five will fill an ordinary pail, the two sides forming an acute angle with each other, and the end is divided into three faces, the terminals of which would intersect an arc of a circle, the sides and end of the box being united by slots and tucks, as will be hereinafter fully set forth.

Figure 1:
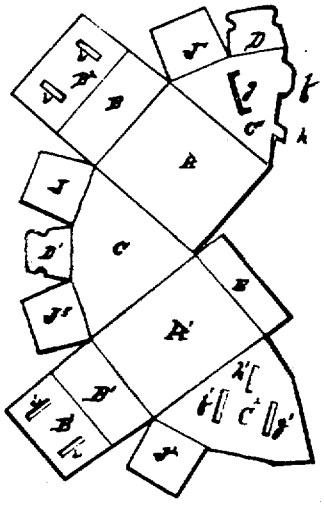
Figure 2:
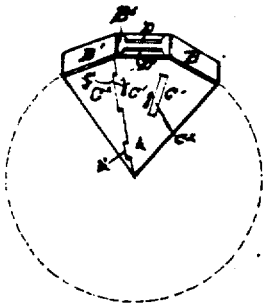

The package-box is illustrated in the accompanying drawings, in which Figure 1 is a view of the blank. Fig. 2 is an oblique view of the package-box.

Like letters designate like parts throughout both views.

A A′ are irregular-shaped pieces, whose outer breadth is greater than the inner, and whose inner corners join, and the edges of these pieces being creased so as to bend the paper. All lines extending over the face of the blank represent the lines for creasing.

E is a flap-extension of the piece A′, and, as folded, lies against the piece A to close the angular bottom. A A′ form the sides of the vessel.

B and B′ are alike in contour, and extend outwardly from the pieces A A′ and form portions of the cover on the two opposite sides of the box, as shown in Fig. 2. Each have two slots, *i i*, in the outer overlapping parts, $B^2$ $B^3$, which slots are opposite each other and receive the tucks D D′.

Between the sides A and A′ is a triangular piece, C, which forms one of the diagonal sides of the box when folded.

J $J^3$ are flaps which are extensions of piece C, and intermediate between these is the tuck D′.

C′ and $C^2$ are parts forming the side of the box opposite C, one overlapping the other, one being provided with slots, and the other with tucks, so as to interlock and hold the sides secure, even when the cover or flap portions are not locked or closed.

J′ is a flap formed of an extension of side C′, and D is one of the interlocking-tucks, also an extension of said side C′.

$C^2$ has a flap-extension, $J^2$, which also forms a portion of the cover.

*f′ g′* represent slots pierced in flap $C^2$ to receive the locking-tongues *f g*, which are formed on the flap C′. As these tucks *f g* are inserted in the slots *f′ g′* and project through them in opposite directions, they form locks or braces to prevent the box being spread apart unless these tucks *f g* are lifted out separately. They therefore securely hold the sides of the box together when the cover is not closed, and prevent its coming apart while it is being filled.

Tuck *h* and slot *h′* are auxiliary to tuck *f* and slot *f′*.

When the sides A A′ C C′ are brought together, with the flap E bent inward to close the bottom, the tucks *f g h* are inserted into the slots *f′ g′ h′*, and the sides are locked together, and the box is in condition for being filled with the material to be packed therein.

When filled, the box is closed as follows: The flaps J J′ $J^2$ $J^3$ are bent down, as before described, and over these are bent the folds B B′. The tucks D D′ are then bent down over the flaps $B^2$ $B^3$ and inserted into the slots *i i*, which locks or secures the cover in position. This forms a triangular or quadrant-shaped package, in which various articles can be packed and the package handled and placed in a round package or vessel, which I have illustrated by dotted lines, Fig. 2, which shows the relation of the box to a vessel with a circular interior, as a pail, which is frequently used for the purpose of inclosing paper packages for shipping. This figure also illustrates the interlocking of the several parts.

Having described my invention, what I desire to secure by Letters Patent is—

1. A quadrant-shaped package-box formed of a single piece having sides secured together by the overlapping sides C′ $C^2$, one of said sides being formed with tucks *f g*, extending in opposite directions, and the other side with slots *f′ g′*, to receive said tucks, and folding overlapping flaps to form a cover on the peripheral edge of the box, substantially as described.

2. A package-box composed of the parts A A′ C C′ $C^2$, with flap-extensions forming the cover of the box, and the side C′, overlapping sides $C^2$, and provided with tucks *f g* and slots *f′ g′*, adapted to interlock to hold the sides of the box together, substantially as herein specified.

3. A quadrant-shaped paper box formed of a single piece having overlapping sides C′ $C^2$, secured together, end flap-extensions projecting from the sides, overlapping flaps $B^2$ $B^3$, extending from two of the sides and formed with slots *i*, and tucks D D′, entering slots *i*, for locking the cover in position, substantially as described.

4. A quadrant-shaped paper box formed of a single piece having overlapping sides C′ $C^2$, folded flap E, forming the closed bottom, and the end folds and flaps projecting from the sides of the box overlapping and interlocking with each other, substantially as described.

5. A package-box having the sides A A′ C and overlapping side flaps, C′ $C^2$, in combination with the overlapping cover B B′, projecting from the sides A A′, and tucks D D′, extending from the sides C C′ and entering the slots *i* in opposite directions, substantially as herein specified.

6. A package-box creased for folding, as specified, having side folds, A and A′, with flap E, end folds, B B′, with each two slots, *i i*, the bottom fold, C, with two flaps, J J, and tuck D, top fold, $C^2$, with slots *h′*, *f′*, and *g′*, and flap $J^2$, top fold, C′, with inner tuck, *g*, and outer tucks, *f h*, flap J′, and tuck D, substantially as shown and described.

THEODORE SCHMIDT.

Witnesses:
WARREN MUNGER,
WALTER S. WOLLASTON.